United States Patent Office 2,705,717
Patented Apr. 5, 1955

2,705,717

PROCESS FOR THE MANUFACTURE OF SALTS OF SULPHURIC ACID ESTERS OF LEUCO VAT DYESTUFFS OF THE ANTHRAQUINONE SERIES

Walter Oppliger, Basel, Switzerland, assignor to Durand & Huguenin A. G., Basel, Switzerland, a Swiss firm No Drawing. Application July 24, 1953,
Serial No. 370,224

Claims priority, application Switzerland July 26, 1952

11 Claims. (Cl. 260—316)

In application Ser. No. 319,174 (now abandoned), filed November 6, 1952 as a continuation-in-part application to application Ser. No. 212,834, filed March 26, 1951 (now also abandoned) is described a process for the manufacture of water-soluble salts of sulphuric acid esters of leuco vat dyestuffs of the anthraquinone series which are difficult to esterify, wherein the vat dyestuff is treated in a mixture of α-picoline and diethylcyclohexylamine containing 10–60, and preferably 15–35 per cent by weight of diethylcyclohexylamine and in the presence of finely divided copper or brass with chlorosulphonic acid in the form of its addition products with the said bases, the chlorosulphonic acid, the mixture of bases and the copper being present in at least certain specified minimum proportions, and the resulting sulphuric acid ester compound is converted into a water-soluble ester salt.

The present invention provides a process for the manufacture of water-soluble salts of sulphuric acid esters of leuco vat dyestuffs of the anthraquinone series which are difficult to esterify, wherein the vat dyestuff is treated in a mixture of α-picoline and methylene-bis-p,p'-(N:N-diethylcyclohexylamine) containing 10–60 per cent by weight of the latter amine and in the presence of finely divided iron, cobalt, nickel, copper or a copper alloy, with chlorosulphonic acid or with a mixture of sulphur trioxide and hydrogen chloride, and the resulting sulphuric acid ester compound is converted into a water-soluble ester salt.

As vat dyestuffs of the anthraquinone series which are difficult to esterify there are to be understood those of which the sulphuric acid ester salts can be obtained by the usual methods of esterification only in small yields, that is to say, yields which are insufficient for commercial purposes or are trace-like, or in the form of products which cannot be converted or can be converted only partially into the original dyestuff by the usual method of application. For the purposes of the present invention, the anthraquinone vat dyestuffs in question are those which are difficult to esterify as determined by the test given in the aforesaid application, Ser. No. 319,174, i. e. which give an ester yield of less than 25% relative to the weight thereof when esterified by means of a mixture of α-picoline and chlorosulphonic acid (10:1 by weight) in the presence of copper powder. Vat dyestuffs of the anthraquinone series which are difficult to esterify are found, for example, in the following classes:

1. 1-aroylaminoanthraquinones which contain as a substituent in the 4-, 5- or 8-position an acylamino or alkoxy group or halogen atom, and especially diaroyl-aminoanthraquinones and their derivatives containing substituents in the benzene nuclei.
2. Anthraquinone-carbazoles.
3. Anthrimides.

The chlorosulphonic acid may be introduced into the reaction mixture as such or partially or completely in the form of an equivalent mixture of sulphur trioxide and hydrogen chloride or in the form of a sulphur trioxide addition product and a hydrochloride of one or both of the bases used.

The α-picoline may be used either in pure form or in the form of a commercial product which boils at 125–128° C.

Methylene-bis-p,p'(N:N-diethyl - cyclohexylamine) of the formula

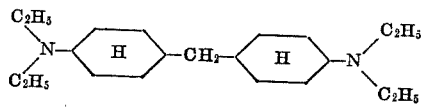

can be prepared by the catalytic hydrogenation of 4:4'-tetra-ethylamino-diphenyl-methane, which latter compound can be obtained, for example, by treating diethyl-aniline with formaldehyde/hydrogen chloride. Methylene-bis-p,p'(N:N-diethyl-cyclohexylamine) is a water-clear oily liquid, and may be used either as the pure base or in the form of a technically anhydrous product.

The use of a mixture of α-picoline and methylene-bis-p,p'(N:N-diethyl-cyclohexylamine) in suitable relative proportions is of critical importance in the present process. Thus, in order to obtain commercially valuable results it is essential that the proportion of methylene-bis-p,p'(N:N-diethyl-cyclohexylamine) in the mixture of bases should be at least 10 and at most 60 per cent on the weight of the mixture. Advantageously the proportion of the said amine lies within the range of 15 to 35 per cent, as then yields of usable sulphuric acid ester salts of more than 90 per cent can be obtained. In order to obtain an optimum yield of sulphuric acid ester salt, the proportion of methylene-bis-p,p'(N:N-diethyl-cyclohexylamine) must be chosen within the aforesaid proportions depending on the behaviour of the particular vat dyestuff used.

In carrying out the process it is not essential to use from the outset a mixture of α-picoline and methylene-bis-p,p'(N:N-diethyl-cyclohexylamine), so that, for example, one of the components of the mixture of bases may be reacted with chlorosulphonic acid and then mixed with a suitable quantity of the other component. It is essential only that, before the commencement of the esterification reaction, the two bases should be present in suitable relative proportions. It will be understood that for the esterification it is necessary to use at least two molecular proportions of chlorosulphonic acid for each anthraquinone nucleus present in the vat dyestuff.

The proportion of the baseic mixture must be such as to provide at least 1.4 molecular proportions of methylene-bis-p,p'(N:N-diethyl-cyclohexylamine) for every two molecular proportions of chlorosulphonic acid used, except that if less than four molecular proportions of the acid is used not less than two molecular proportions of the said amine should be present for every two molecular proportions of the acid. However, in order to obtain optimum results, it will usually be necessary to use a proportion of chlorosulphonic acid, and correspondingly of the basic mixture several times greater than the minimum proportions mentioned above. The most favourable excess to use depends on the properties of the particular dyestuff to be esterified, and can easily be determined by preliminary tests.

The sulphuric acid ester compound resulting from the esterification is converted into a water-soluble ester salt by a method in itself known, for example, by treatment with a suitable base or by any other conventional method. Especially suitable water-soluble sulphuric acid ester salts are the lithium, sodium, potassium, ammonium and hydroxy-alkylamine salts. In the present process there is used as the metal finely divided iron, nickel, cobalt, copper or a copper alloy. By the expression "finely divided" there is to be understood, for example, the powdered form hitherto used, and preferably a fineness such that the metal passes through a 150–200 mesh sieve (see Handbook of Chemistry and Physics, 31st edition, page 2669). The proportion of the metal should be at least 1.5, and preferably at least 2, atomic proportions for each anthraquinone nucleus present in the vat dyestuff. However, it will usually be of advantage to use a proportion considerably in excess of the minimum proportion.

In one form of the process the reaction is carried out in the presence of not only one of the said metals, but in the presence of a plurality of these metals. It is of special advantage from the practical point of view to use iron, owing to its low cost.

In another form of the process the metal to be used is subjected to an activating treatment prior to the esterification process and in the absence of the vat dyestuff to be esterified.

This activating treatment may be carried out in various ways, for example

1. By the addition of the metal powder to the basic mixture and the subsequent introduction of the chlorosulphonic acid dropwise.
2. By the addition of the metal powder to a preformed mixture of α-picoline/SO₃ and α-picoline/HCl and the introduction of the methylene-bis-p,p'-(N:N-diethyl-cyclohexylamine).
3. By introducing the chlorosulphonic acid dropwise into the basic mixture and then adding the metal powder.
4. By activating the metal powder in the absence of the basic mixture and subsequently adding it to that mixture. Thus, the activation may be carried out, for example, by treating iron powder for a short time with glacial acetic acid at a raised temperature, filtering with suction, and washing the filter residue (consisting of activated iron) with α-picoline, or by any other well known method.

If desired, the process of this invention may be carried out with the exclusion of oxygen.

The new process is distinguished in that it is possible by starting from the vat dyestuff to obtain in a single operation and in very good yield a sulphuric acid ester salt which can be reconverted into the original dyestuff by known methods of application.

The following examples illustrate the invention, the parts being by weight:

Example 1

25 parts of chlorosulphonic acid are introduced dropwise, while stirring and cooling, into 160 parts of α-picoline, and 25 parts of iron powder, 58 parts of methylene - bis - p,p'-(N:N-diethyl-cyclohexylamine) and 10 parts of 1:5-dibenzoylamino-anthraquinone are added. The mixture is stirred with the exclusion of moisture for 5 hours at 50° C., whereby the dyestuff gradually dissolves.

For the purpose of working up, the reaction mixture is introduced into 1000 parts of sodium carbonate solution of 4 per cent strength, and the α-picoline is removed by distillation in vacuo. The sulphuric acid ester of leuco-1:5-dibenzoylaminoanthraquinone separates in an oily form as its salt with methylene-bis-p,p'-(N:N-diethylcyclohexylamine). By stirring the oil with 250 parts of sodium hydroxide solution of 4 per cent strength, the ester is converted into its sodium salt, and, after separating the liberated base, the sodium salt is isolated by salting out.

The yield of the sulphuric acid ester salt is about 90 per cent. When it is applied to cotton by known methods gold-yellow tints are obtained having excellent properties of fastness.

Instead of 25 parts of iron powder there may be used with equal success 25 parts of copper powder.

The reaction period may be substantially shortened, by activating the metal by stirring it for 30 minutes with the reaction product of α-picoline and chlorosulphonic acid, advantageously at a temperature of 20–40° C.

Example 2

To a mixture of 160 parts of α-picoline and 20 parts of chlorosulphonic acid, the mixture having been prepared while stirring, and cooling, there are added 20 parts of brass powder, and the whole is stirred for 30 minutes. There are then introduced dropwise 58 parts of methylene-bis-p,p'-(N:N-diethyl-cyclohexylamine), 10 parts of 1:5-dibenzoylaminoanthraquinone are introduced, and the mixture is stirred for 5 hours at 50° C. The product is worked up in the manner described in Example 1. The yield is almost quantitative.

Instead of 10 parts of 1:5-dibenzoylamino-anthraquinone, 10 parts of 1-benzoylamino-5-chloranthraquinone or 10 parts of 1-benzoylamino-4-methoxyanthraquinone can be converted into its sulphuric acid ester salt under the same conditions.

Example 3

25 parts of chlorosulphonic acid are introduced dropwise, while stirring and cooling, into 150 parts of α-picoline. 25 parts of iron powder are then introduced and activated, as described in Example 1, at 40° C. for 30 minutes. After cooling the mixture to about 20° C., there are introduced dropwise 58 parts of methylene-bis-p,p'-(N:N-diethyl-cyclohexylamine), and 10 parts of 1 - benzoylamino-4-(4'-dimethylsulphonamido) - benzoyl-amino-anthraquinone are added. The mixture is stirred for 3 hours at 50° C. and worked up in the manner described in Example 1. The yield of the sulphuric acid ester salt amounts to about 85 per cent. It yields on cotton by the usual method of application extraordinarily fast pink tints.

1:4-dibenzoylaminoanthraquinone can be converted into its sulphuric acid ester salt with equal success in the manner described above.

Instead of 25 parts of iron powder, there may be used 25 parts of brass powder or 25 parts of cobalt powder or nickel powder.

Example 4

58 parts of methylene-bis-p,p'-(N:N-diethyl-cyclohexylamine), 25 parts of brass powder and 10 parts of carbazolised di-(5'-benzoylamino-1'-anthraquinonyl) - 2:8-diaminochrysene are added to a mixture, prepared in the cold, of 160 parts of α-picoline and 25 parts of chlorosulphonic acid.

For the purpose of working up, the whole is mixed with 1500 parts of sodium hydroxide solution of 4 per cent strength and the α-picoline is distilled off in vacuo. The methylene-bis-p,p'-(N:N-diethylcyclohexylamine) is extracted with benzene and the sulphuric acid ester salt is isolated by salting out, after removing the metal residue.

The sulphuric acid ester salt, which is obtained in a yield of about 80 per cent, produces when applied in known manner to cotton yellow-brown dyeings or prints having excellent properties of fastness.

The brass powder may be replaced by 25 parts of iron powder.

Instead of carbazolized di-(5'-benzoylamino-1'-anthraquinonyl)-2:8-diaminochrysene, there may be used with similar success 10 parts of the carbazole from 1:4-diaminoanthraquinone and 1-chloro-8-benzoylaminoanthraquinone.

Example 5

Into 96 parts of α-picoline there are introduced dropwise, while stirring and cooling, 12 parts of chlorosulphonic acid, and 25 parts of methylene-bis-p,p'-(N:N-diethylcyclohexylamine), 15 parts of copper powder and 10 parts of the anthrimide from 1:3-dichloro-2-methylanthraquinone and 1:4-monobenzoyldiaminoanthraquinone are added. After stirring the whole for 5 hours at 50° C., the reaction is finished. The product is worked up in the manner described in Example 1. There is obtained in a yield of 70–80 per cent a sulphuric acid ester salt which dyes cotton in the usual manner grey tints having good properties of fastness.

The same result is obtained by using, instead of 15 parts of copper powder, 10 parts of iron powder activated as described in Example 1.

What I claim is:

1. A process for the manufacture of a water-soluble salt of a sulphuric acid ester of a leuco vat dyestuff of the anthraquinone series, which dyestuff gives an ester yield of less than 25% relative to the weight thereof when esterified by means of a mixture of α-picoline and chlorosulphonic acid (10:1 by weight) in the presence of copper powder, comprising reacting the corresponding vat dyestuff with a product selected from the group consisting of chlorosulphonic acid and of an equivalent mixture of sulphur trioxide and hydrogen chloride, in a mixture of α-picoline and methylene-bis-p,p'-(N:N-diethylcyclohexylamine) containing 10–60 per cent by weight of methylene-bis-p,p'-(N:N-diethylcyclohexylamine) and in the presence of a member selected from the group consisting of finely divided copper, brass, iron, nickel and cobalt.

2. A process for the manufacture of a water-soluble salt of a sulphuric acid ester of a leuco vat dyestuff of the anthraquinone series, which dyestuff gives an ester yield of less than 25% relative to the weight thereof when esterified by means of a mixture of α-picoline and chlorosulphonic acid (10:1 by weight) in the presence of copper powder, comprising reacting the corresponding vat dyestuff with a product selected from the group consisting of chlorosulphonic acid and of an equivalent mixture of sulphur trioxide and hydrogen chloride, in a mixture of α-picoline and methylene-bis-p,p'-(N:N-diethyl-cyclohexylamine) containing 15-35 per cent by weight of methylene-bis-p,p'-(N:N-diethyl-cyclohexylamine and in the presence of a member selected from the group consisting of finely divided copper, brass, iron, nickel and cobalt.

3. A process for the manufacture of the water-soluble salt of the sulphuric acid ester of leuco 1-benzoylamino-4-(4' - dimethylsulfamino) - benzoylaminoanthraquinone, comprising reacting 1-benzoylamino-4-(4'-dimethylsulfamino) - benzoylaminoanthraquinone with chlorosulphonic acid in a mixture of α-picoline and methylene-bis-p,p'-(N:N-diethyl-cyclohexylamine) containing 15-35 per cent by weight of methylene-bis-p,p'-(N:N-diethyl-cyclohexylamine) and in the presence of finely divided iron.

4. A process for the manufacture of a water-soluble salt of a sulphuric acid ester of a leuco vat dyestuff of the anthraquinone series, which dyestuff gives an ester yield of less than 25% relative to the weight thereof when esterified by means of a mixture of α-picoline and chlorosulphonic acid (10:1 by weight) in the presence of copper powder; comprising reacting the corresponding vat dyestuff with a product selected from the group consisting of chlorosulphonic acid and of an equivalent mixture of sulphur trioxide and hydrogen chloride, in a mixture of α-picoline and methylene-bis-p,p'(N:N-diethyl-cyclohexylamine) containing 15-35 per cent by weight of methylene-bis-p,p' - (N:N-diethyl-cyclohexylamine) and in the presence of finely divided copper.

5. A process for the manufacture of a water-soluble salt of a sulphuric acid ester of a leuco vat dyestuff of the anthraquinone series, which dyestuff gives an ester yield of less than 25% relative to the weight thereof when esterified by means of a mixture of α-picoline and chlorosulphonic acid (10:1 by weight) in the presence of copper powder, comprising reacting the corresponding vat dyestuff with a product selected from the group consisting of chlorosulphonic acid and of an equivalent mixture of sulphur trioxide and hydrogen chloride, in a mixture of α-picoline and methylene-bis-p,p'-(N:N-diethyl-cyclohexylamine) containing 15-35 per cent by weight of methylene - bis-p,p'-(N:N-diethyl-cyclohexylamine) and in the presence of finely divided brass.

6. A process for the manufacture of a water-soluble salt of a sulphuric acid ester of a leuco vat dyestuff of the anthraquinone series, which dyestuff gives an ester yield of less than 25% relative to the weight thereof when esterified by means of a mixture of α-picoline and chlorosulphonic acid (10:1 by weight) in the presence of copper powder, comprising reacting the corresponding vat dyestuff with a product selected from the group consisting of chlorosulphonic acid and of an equivalent mixture of sulphur trioxide and hydrogen chloride, in a mixture of α-picoline and methylene-bis-p,p'-(N:N-diethyl-cyclohexylamine) containing 15-35 per cent by weight of methylene-bis-p,p'-(N:N-diethyl-cyclohexylamine) and in the presence of finely divided iron.

7. A process according to claim 6 wherein the iron is subjected, prior to the esterification process and in the absence of the vat dyestuff to be esterified, to an activation treatment.

8. A process for the manufacture of the water-soluble salt of the sulphuric acid ester of the leuco compound of the anthrimide prepared from 1:3-dichloro-2-methylanthraquinone and 1:4-monobenzoyl-diamino anthraquinone, comprising reacting the leuco compound of the anthrimide prepared from 1:3-dichloro-2-methylanthraquinone and 1:4-monobenzoyl-diamino-anthraquinone with chlorosulphonic acid in a mixture of α-picoline and methylene - bis-p,p'-(N:N-diethyl-cyclohexylamine) containing 15-35 per cent by weight of methylene-bis-p,p'-(N:N-diethyl-cyclohexylamine) and in the presence of finely divided copper.

9. A process for the manufacture of the water-soluble salt of the sulphuric acid ester of leuco 1:5-dibenzoyl-amino-anthraquinone, comprising reacting 1:5-dibenzoyl-aminoanthraquinone with chlorosulphonic acid in a mixture of α-picoline and methylene-bis-p,p'-(N:N-diethyl-cyclohexylamine) containing 15-35 per cent by weight of methylene - bis-p,p'-(N:N-diethyl-cyclohexylamine) and in the presence of finely divided brass.

10. A process for the manufacture of the water-soluble salt of the sulphuric acid ester of carbazolized leuco-di-(5' - benzoylamino-1'-anthraquinonyl)-2:8-diaminochrysene, comprising reacting carbazolized di-(5'-benzoylamino - 1' - anthraquinonyl)-2:8-diaminochrysene with chlorosulphonic acid in a mixture of α-picoline and methylene-bis-p,p'-(N:N-diethyl-cyclohexylamine) containing 15-35 per cent by weight of methylene-bis-p,p'-(N:N-diethyl-cyclohexylamine) and in the presence of finely divided brass.

11. A process for the manufacture of the water-soluble salt of the sulphuric acid ester of leuco 1:5-di-benzoyl-amino-anthraquinone, comprising reacting 1:5-dibenzoyl-amino-anthraquinone with chlorosulphonic acid in a mixture of α-picoline and methylene-bis-p,p'-(N:N-diethyl-cyclohexylamine) containing 15-35 per cent by weight of methylene-bis-p,p'-(N:N-diethyl-cyclohexylamine) and in the presence of finely divided iron.

References Cited in the file of this patent

UNITED STATES PATENTS

| | | |
|---|---|---|
| 2,043,226 | Lecher et al. | July 2, 1946 |
| 2,506,580 | Coffey et al. | May 9, 1950 |
| 2,563,819 | Coffey et al. | Aug. 14, 1951 |
| 2,660,580 | Von | Nov. 24, 1953 |